United States Patent [19] [11] 4,149,191
Longchamp [45] Apr. 10, 1979

[54] METHOD AND SYSTEM FOR CONVERTING THE IMAGE CONTENT OF TRANSPORTED FILM INTO TELEVISION SIGNAL PICTURE INFORMATION

[76] Inventor: Jean-Francois Longchamp, Chemin de Gresy 19, CH-1012 Lausanne, Switzerland

[21] Appl. No.: 811,157

[22] Filed: Jun. 29, 1977

[30] Foreign Application Priority Data

Jul. 19, 1976 [DE] Fed. Rep. of Germany ....... 2632378

[51] Int. Cl.² .............................................. H04N 3/36
[52] U.S. Cl. .................................... 358/214; 358/212
[58] Field of Search ..................... 358/8, 54, 212, 214, 358/130, 6

[56] References Cited

U.S. PATENT DOCUMENTS

| | | | |
|---|---|---|---|
| 3,860,952 | 1/1975 | Tallbot et al. | 358/8 |
| 3,953,885 | 4/1976 | Biber | 358/54 |
| 4,013,832 | 3/1977 | Douglas | 358/212 |

Primary Examiner—Richard Murray
Attorney, Agent, or Firm—Michael J. Striker

[57] ABSTRACT

A succession of film frames is continuously transported past at least one row of optoelectronic converters. The information registered by the row of optoelectronic converters is periodically read out and written-in into a storage. The information stored in the storage is read out at a rate and in a sequence converting the information in the storage into television signal picture information.

6 Claims, 2 Drawing Figures

METHOD AND SYSTEM FOR CONVERTING THE IMAGE CONTENT OF TRANSPORTED FILM INTO TELEVISION SIGNAL PICTURE INFORMATION

BACKGROUND OF THE INVENTION

The present invention relates to methods and systems for converting the image content of a continuously transported succession of originals, e.g., frames of a photographic film, into television signal picture information.

A system of this general type is already known in which a photographic film is continuously transported past a scanning tube. The vertical deflection of the scanning tube is automatically controlled in dependence upon film transport. When this known system is used to form a television signal of the interlaced-field type, it is necessary that each frame of the film be scanned twice in succession, for example to form standard European T.V. signals having 25 T.V. frames (field pairs) per second. However, because the film is being transported during the course of the scanning operation, the two rasters which respectively correspond to the two fields of a T.V. frame must be formed upon two different parts of the scanning tube. This leads to serious registration problems. These registration problems can be overcome only at considerable expense.

SUMMARY OF THE INVENTION

It is a general object of the invention to provide a method and system of the type in question in which the image content of the original to be scanned is scanned in a single succession of line-scan operations, not a first succession of line-scan operations corresponding to the first T.V. field followed by a second succession of line-scan operations corresponding to the second T.V. field. Thus, it is an object of the invention to avoid the aforementioned registration problems, in the first place, and accordingly to avoid also the expense involved in the equipment for overcoming those registration problems.

It is another object of the invention to provide a method and system of the type in question in which the expense involved in the means for properly controlling the horizontal and vertical deflection operations of prior-art scanning tubes is eliminated.

These objects can be met by continuously transporting the succession of originals past at least one stationary row of optoelectronic converters, effecting read-out of the information registered by the row of optoelectronic converts and effecting write-in of that information into a storage, and effecting read-out of the information stored in the storage at a rate and in a sequence converting the information in the storage into television signal picture information.

The storage required for the inventive method and system admittedly must have a very great storage capacity. However, the cost of a storage of so great a capacity is nowadays quite acceptable for the intended application, due to the great progress which has been made in semiconductor storage technology. Also, the costs of such high-capacity storages are likely to decrease further.

DESCRIPTION OF THE PREFERRED EMBODIMENTS

Figure 1:
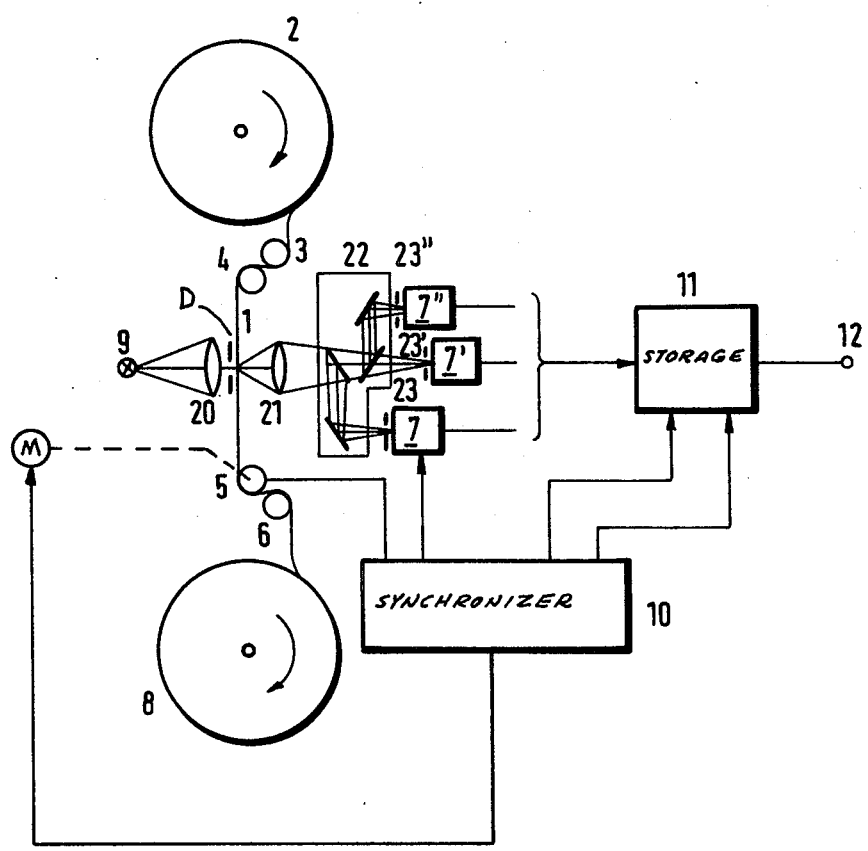
FIG. 1 schematically depicts a system used for performing the inventive method.

In the schematically depicted arrangement of FIG. 1, a photographic film 1 is pulled of a supply reel 2, transported over guide rollers 3, 4, 5, 6 past a row of optoelectronic transducers 7, and taken up on a take-up reel 8.

The light employed for scanning each frame of the film 1 is emitted from a lamp 9. To establish the requisite film transport speed, the guide roller 5 is driven by a drive motor M. The speed of operation of drive motor M is controlled by a synchronizing circuit (clock-pulse generator) 10. It is particularly advantageous to control the speed of operation of the drive motor in dependence upon the operation of the synchronizing circuit 10, when the film scanner of the present invention is to be used in conjunction with other T.V.-signal-processing equipment also controlled by synchronizer 10, for example in a T.V. studio.

However, as an alternative, it would also be possible to drive roller 5 by means of a constant-speed motor, e.g. a speed-regulated D.C. motor or a synchronous motor, derive synchronizing pulses from the motor, and then utilize such synchronizing pulses to synchronize the operation of the synchronizing circuit 10 with that of the motor. This alternative approach would be particularly advantageous when the film scanner is not being used in conjunction with other T.V.-signal-processing equipment, i.e., not in a studio but instead in for example private use.

In any event, the light emitted by lamp 9 is collected by a condenser 20 and projected through the continuously transported film 1. A diaphragm D having a narrow slit extending perpendicular to the plane of the illustration serves to reduce the effects of stray light. An objective 21 and a beam-splitting system 22 projects the image of the film frame being scanned onto three rows 7, 7', 7" of optoelectronic converters. Each row 7, 7', 7" consists of a large number of optoelectronic transducers arranged in a straight row extending perpendicular to the plane of illustration of FIG. 1. The beam-splitting system 22 may consist of a conventional arrangement of color-selective dichroic mirrors, or the like, and serves to split the incoming image into the component colors thereof required for color television, and to direct the three color-component images onto respective ones of the three rows 7, 7', 7" of optoelectronic converters.

If the breadth of the light-sensitive surface of the row of optoelectronic converters 7, 7' or 7" is greater than the breadth of the scan line image projected toward the row of converters, diaphragms 23, 23', 23" having slit-shaped apertures of the requisite dimensions can be located in front of the optoelectronic converters, as illustrated.

In general, the resolution required in color-television systems for the red and blue component images is not so great as that required for the green component image. Accordingly, the rows of optoelectronic converters associated with the red and blue component images could consist of fewer converters than the row associated with the green component image. Also, instead of the illustrated set-up, it would also be possible, using suitable projection techniques, to project the three component images of the scan line onto one row of optoelectronic converters, one next to the other.

As schematically depicted in FIG. 1, the signals stored in the three rows 7, 7', 7" of optoelectronic converters are written-in into a storage 11; this is accomplished by means of write-in control pulses furnished to the storage by the synchronizer (clock pulse generator) 10. Thereafter, the signals stored in storage 11 are read out therefrom at the output 12 thereof, by means of readout control pulses from synchronizer 10. This is explained in more detail below.

The use of a storage makes it possible to simultaneously call forth the three sets of color-component information of a scanned line and, by controlling the timing of the write-in and read-out control pulses, to bring the three sets of color-component information into proper registration.

Finally, it is to be noted that the present system can also be utilized for black-and-white T.V. signals, in which case the beam-splitting system 22 can be eliminated, and only a single row of optoelectronic converters need be used.

As explained with reference to FIG. 2, the information registered by the row of optoelectronic converters 7 is read out therefrom linewise, i.e., serially, and written-in into the storage 11. The read-out of the row of optoelectronic converters and the write-in of the read-out information into the storage are effected under the control of read-out and write-in control pulses furnished by the synchronizer 10. Additionally, synchronizer 10 supplies read-out control pulses for effecting readout from the storage 11; the read-out of the storage 11 is performed in accordance with one of the conventional television systems, e.g., 625 lines per frame, 50 frames per second, two interlaced fields per frame.

Figure 2:
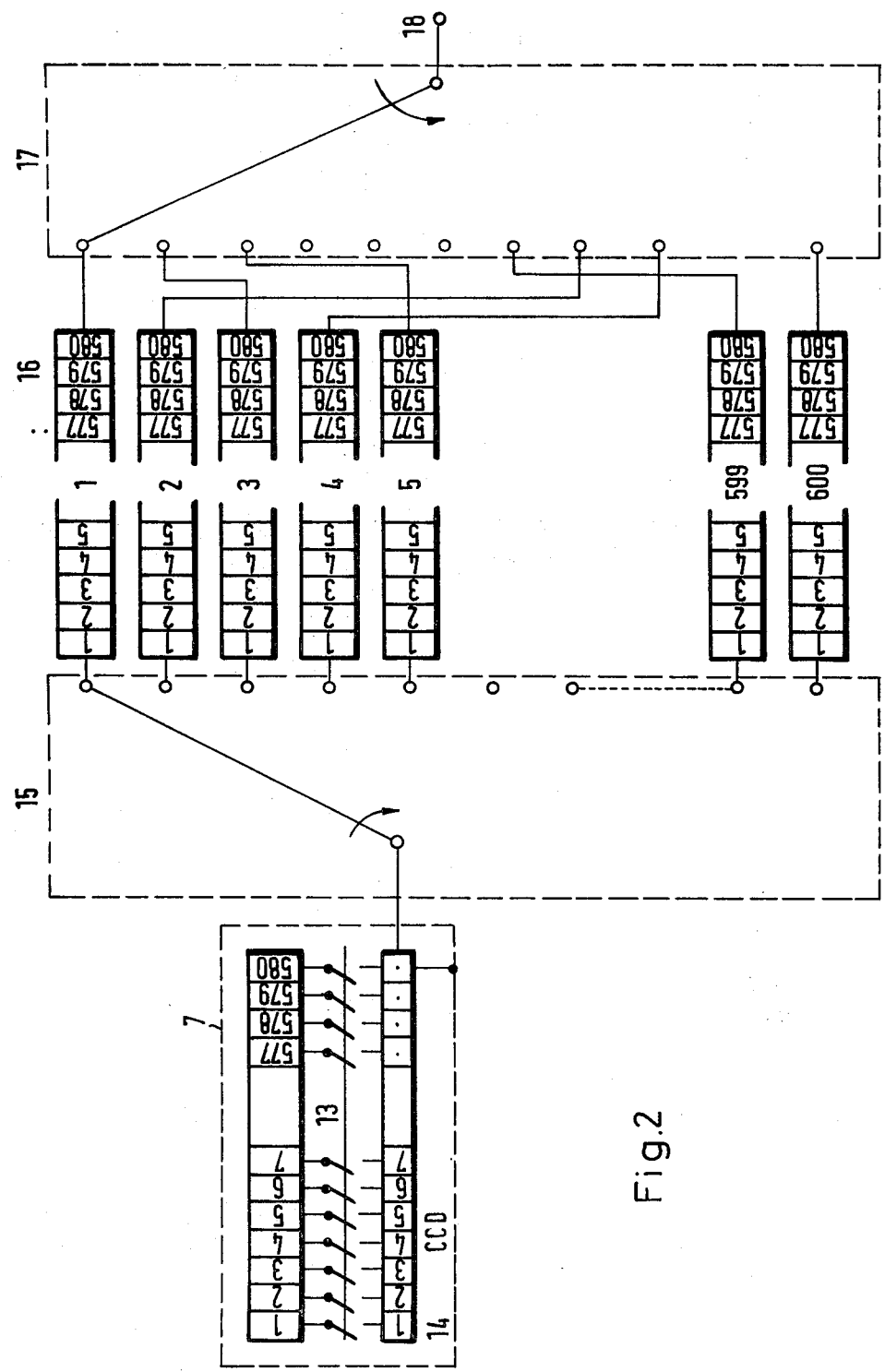
FIG. 2 schematically depicts the cooperation between the optoelectronic converters and the storage in the system shown in FIG. 1.

FIG. 2 schematically depicts the cooperation between the rows of optoelectronic converters and the storage. The scanning element 7, often referred to in the art as a lnear array detector (LID), consists of a number of optoelectronic converters corresponding to the desired degree of horizontal resolution. In the illustrative embodiment, the scanning element 7 comprises 580 optoelectronic converters arranged in a straight line. Each of the 580 optoelectronic converters stores an amount of charge proportional to the intensity of light incident thereon. The electrostatic information registered by these 580 optoelectronic converters is transmitted, in parallel, by means of a set of switches 13, to respective shift-register stages of a charge-coupled shift register 14. The transmission of information to the shift register by the switch set 13 is performed at regular intervals. The time interval between successive transmission moments corresponds to the time required for the scanning of one scan line on a frame of the film being scanned. In turn, this time interval corresponds to the time interval required for one frame of the film 1 to be transported past the scanner, divided by the number of line scans to be performed.

In the illustrative embodiment, the number of scan lines for which the storage is set up is 600, since with television signals of European T.V. systems only about 600 lines are available for the transmission of the picture content.

Serial read-out of the LID is effected using a train of read-out control pulses having a pulse-repetition frequency equal to 580 times the line frequency used for the film-scanning operation, and the signals read out from the LID are transmitted to a routing stage 15. The setting of the routing stage 15 is changed at intervals equal to the reciprocal of the line frequency employed during the scanning of the film frame, so that during each film-scan line period the input of the routing stage 15 will be connected to a different one of the outputs thereof; the control of the routing stage is effected using a train of control pulses whose pulse-repetition frequency is equal to the line frequency employed during the scanning of the film frame. In this way, the information serially read out from the LID after each scanning of a film frame line is transmitted to a different respective one of the 600 580-storage-unit storage sections of the storage 16.

To effect read-out of the storage 16, use is made of a routing stage 17 which is caused to change its setting at intervals equal to the reciprocal of the line frequency utilized in one of the standard conventional T.V. systems. During each respective line period, the output 18 of routing stage 17 is connected to a different respective one of the 600 inputs thereof. For the first field (half frame), the output 18 is connected to successive ones of the odd-numbered inputs, and for the second field the output 18 is connected to successive ones of the even-numbered inputs. The routing stage 17 is caused to change settings by a train of clock pulses furnished by the synchronizer 10 and having a pulse-repetition frequency equal to the line frequency of the one of the standard conventional T.V. systems which is to be used.

The serial read-out of the signals from the individual ones of the 600 line storages of storage 16 is effected using trains of read-out control pulses whose pulse-repetition frequency is so selected that the time interval required for the serial read-out of the 580 information storage units of one line storage is not greater than, and preferably about equal to, the useful part of one horizontal line period in whichever standard T.V. system is to be employed. For example, in European T.V. systems, the line period equals 64 microseconds, of which 52 microseconds is utilized for the actual picture signal; in that event, the frequency of the read-out control pulses should accordingly be about 11 MHz.

To illustrate the durations and rates of the operations involved in scanning the photographic film 1, let it be assumed that the film is continuously transported past the LID at a speed of 18 frames per second. If the number of line scans to be performed upon one film frame is 600, then the line period (for the scanning of film) is equal to about 92.5 microseconds, corresponding to a frequency of about 10.6 kHz. Accordingly, the repetition frequency of the read-out control pulse train used to effect serial read-out of the 580-stage shift register 14 should then be about 6.3 MHz; this should of course also be the frequency of the write-in control pulse train used to effect the corresponding serial write-in of the signals from shift register 14 into one of the 580-unit line storages of storage 16.

In theory, the speed (in frames per second) at which the photographic film is transported past the scanner is unrelated to the T.V.-image frequency (in T.V.-frames per second). However, to simplify the design of the storage devices involved, it is to be recommended to maintain a simple ratio between the T.V.-image frequency and the frames-per-second film transport speed. For example, if the scanned film is being transported past the scanner at a speed of 16⅔ frames/second, the scanning of two film frames is performed within a time interval corresponding to three T.V. frames (field pairs); as another example, if the scanned film is being transported past the scanner at a speed of 18¾ frames/second, the scanning of three film frames is performed within a time interval corresponding to four T.V. frames (field pairs).

Because the duration of the time interval required for the scanning of one film frame is to a very great extent independent of which one of the standard conventional T.V. systems is going to be utilized, the rate at which the film is scanned can be readily varied, e.g., for speed-up and slow-motion effects or the like.

Additionally, stop-motion effects can be achieved. After the film frame of interest has been scanned, and the information derived therefrom written-in into the storage 16, the storage 16 can be read out repeatedly in order to produce a persisting T.V. image of the film frame in question.

If for any reason, e.g., for special effects, the film 1 is transported in backward direction past the scanner, reproduction of the resultant T.V. picture signal would still be possible; however, it would be necessary to reverse the illustrated sense of rotation of the switch means in one of the two routing stages 15, 17, because otherwise the reproduced T.V. picture would be inverted.

To simplify the drawing, the routing stages 15 and 17 are depicted as being essentially comprised of rotary switches. However, it will be appreciated that conventional information-routing electronics will usually be preferred. For example, the signals serially read out from the shift register 14 can be applied to the inputs of all 600 of the line storages in the storage 16; however, only that line storage which is actually to register these signals will be supplied with write-in control pulses.

FIG. 2 depicts the cooperation between a single line scanner 7 for one color component and the associated storage 16. If three line scanners 7, 7', 7" are provided, one for each color component, then each of the additional two line scanners can have associated with it a respective one of two further storages like storage 16, cooperating with routing stages like stages 15 and 17, all of which in conjunction would correspond to the storage 11 of FIG. 1. If three parallel transmission paths are employed in that manner, then the three color-component signals at the output 18 of the three storages would, in conventional manner, be applied to a matrix for the generation of standard color-difference and luminance signals. The manner in which the three color-component picture signals which would appear at the outputs of the three storages are to be converted into a conventional color T.V. signal (e.g., for broadcast purposes or for display on a conventional television receiver) need not be explained.

It will be understood that each of the elements described above, or two or more together, may also find a useful application in other types of circuits and arrangements differing from the types described above.

While the invention has been illustrated and described as embodied in a system for converting picture information on a strip of photographic film frames into color T.V. signal picture information, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method of converting the image content of a succession of originals into television signal picture information, the steps of continuously transporting the succession of originals past a row of optoelectronic converters, effecting read-out of the information registered by the row of optoelectronic converters, during one passage of an original past said row effecting write-in of this information from the converters into a storage, and effecting read-out of the information stored in the storage at a rate and in a sequence converting the information in the storage into television signal picture information in which the picture content corresponding to the image lines of one of the two interlaced fields of a television frame is disinterlaced in time from the picture content corresponding to the image lines of the other of the two interlaced fields of a television frame.

2. In a method as defined in claim 1, the method being used to form a television signal having a predetermined number of horizontal line intervals per frame interval, the step of effecting read-out of the information registered by the row of optoelectronic converters comprising effecting the read-out with a frequency such that the row of converters is read out a number of times equal to said predetermined number during the time interval required for one complete original of the succession of originals to move past the row of converters.

3. In a method as defined in claim 2, the read-outs of the row of converters performed during the transport of one original past the row of converters consisting of a first succession of odd-numbered read-outs interlaced with a second succession of even-numbered read-outs, the information registered by the converters during the even-numbered read-outs corresponding to the picture content of one of the two interlaced fields of a television frame, the information registered by the converters during the odd-numbered read-outs corresponding to the picture content of the other of the two interlaced fields of a television frame, the step of effecting read-out of the information stored in the storage comprising first reading-out in succession the information corresponding to one of said first and second successions and thereafter reading-out in succession the information corresponding to the other of said first and second successions to form an output signal in which the picture content corresponding to the image lines of one of the two interlaced fields of the television frame is disinterlaced in time from the picture content corresponding to the image lines of the other of the two interlaced fields of the television frame.

4. In a system for converting the image content of a succession of originals into television signal picture information, in combination, a row of optoelectric converters; means for continuously transporting a succession of originals past the row of optoelectronic converters; storage means; means for reading-out the information registered by the row of optoelectronic converters during one passage of an original past said row and writing-in this read out information into the storage means; and means for reading-out the information stored in the storage means at a rate and in a sequence converting the information in the storage means into television signal picture information in which the picture content corresponding to the image lines of one of the two interlaced fields of a television frame is disinterlaced in time from the picture content corresponding to the image lines of the other of the two interlaced fields of a television frame.

5. In a system as defined in claim 4, the system being used to form a television signal having a predetermined number of horizontal line intervals per frame interval, the means for reading-out the information registered by the row of optoelectronic converters comprising means for effecting the read-out of the row with a frequency such that the row of converters is read out a number of times equal to said predetermined number during the time interval required for one complete original of the succession of originals to move past the row of converters.

6. In a system as defined in claim 5, the read-outs of the row of converters performed during the transport of one original past the row of converters consisting of a first succession of odd-numbered read-outs interlaced with a second succession of even-numbered read-outs, the information registered by the converters during the even-numbered read-outs corresponding to the picture content of one of the two interlaced fields of a television frame, the information registered by the converters during the odd-numbered read-outs corresponding to the picture content of the other of the two interlaced fields of a television frame, the means for reading-out the information in the storage means comprising means operative for first reading-out in succession the information corresponding to one of said first and second successions and for thereafter reading-out in succession the information corresponding to the other of said first and second successions to form an output signal in which the picture content corresponding to the image lines of one of the two interlaced fields of a television frame is disinterlaced in time from the picture content corresponding to the image lines of the other of the two interlaced fields of a television frame.

* * * * *

UNITED STATES PATENT AND TRADEMARK OFFICE
CERTIFICATE OF CORRECTION

PATENT NO. : 4,149,191
DATED : April 10, 1979
INVENTOR(S) : Jean-Francois Longchamp It is certified that error appears in the above—identified patent and that said Letters Patent are hereby corrected as shown below:

In the heading, insert the name and address of the Assignee as follows:

Robert Bosch GmbH
    Stuttgart
    Federal Republic of Germany

Signed and Sealed this

Twenty-fifth Day of September 1979

[SEAL]

Attest:

LUTRELLE F. PARKER

*Attesting Officer*     *Acting Commissioner of Patents and Trademarks*